(12) United States Patent
Kim et al.

(10) Patent No.: US 8,238,089 B2
(45) Date of Patent: Aug. 7, 2012

(54) PORTABLE TERMINAL, DISPLAY MODULE THEREOF, AND METHOD FOR FABRICATING THE DISPLAY MODULE

(75) Inventors: Moon-Pyoung Kim, Gyeonggi-Do (KR); Chang-Bai Won, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 398 days.

(21) Appl. No.: 12/483,207

(22) Filed: Jun. 11, 2009

(65) Prior Publication Data

US 2010/0029339 A1 Feb. 4, 2010

(30) Foreign Application Priority Data

Aug. 1, 2008 (KR) .................. 10-2008-0075809

(51) Int. Cl.
*G06F 1/16* (2006.01)
(52) U.S. Cl. ........... 361/679.3; 361/679.21; 361/679.55; 361/679.56; 455/575.1; 312/223.1; 312/223.2
(58) Field of Classification Search ................ 361/679.3
See application file for complete search history.

(56) References Cited

U.S. PATENT DOCUMENTS

| | | | | |
|---|---|---|---|---|
| 5,109,292 A | * | 4/1992 | Yamazaki et al. | 349/122 |
| 5,251,280 A | * | 10/1993 | Asada et al. | 385/115 |
| 6,801,268 B2 | * | 10/2004 | Huang et al. | 349/58 |
| 7,859,831 B2 | * | 12/2010 | Nakanishi et al. | 361/679.24 |
| 7,864,260 B2 | * | 1/2011 | Lee et al. | 349/58 |
| 7,911,774 B2 | * | 3/2011 | Nakanishi et al. | 361/679.21 |
| 2004/0056998 A1 | * | 3/2004 | Hoshino | 349/113 |
| 2008/0007159 A1 | * | 1/2008 | Seo et al. | 313/504 |
| 2009/0175028 A1 | * | 7/2009 | Luh et al. | 362/97.2 |
| 2009/0257189 A1 | * | 10/2009 | Wang et al. | 361/679.56 |
| 2010/0014232 A1 | * | 1/2010 | Nishimura | 361/679.3 |

* cited by examiner

*Primary Examiner* — Anthony Q Edwards
(74) *Attorney, Agent, or Firm* — Lee, Hong, Degerman, Kang & Waimey (57) ABSTRACT

A display module for a portable terminal comprises: a display panel; an outer frame configured to wrap a bottom surface and a plurality of side surfaces of the display panel; an inner frame sandwiched between the display panel and the outer frame, and having a bottom surface supporting portion and a plurality of side surface supporting portions for supporting the bottom surface and the plurality of side surfaces of the display panel, respectively, wherein at least one of the plurality of side surface supporting portions is excluded; and a filling member filled into a gap between the display panel and the outer frame in which at least one of the plurality of side surface supporting portions is excluded.

6 Claims, 7 Drawing Sheets

PORTABLE TERMINAL, DISPLAY MODULE THEREOF, AND METHOD FOR FABRICATING THE DISPLAY MODULE

RELATED APPLICATION

The present disclosure relates to subject matter contained in priority Korean Application No. 10-2008-0075809, filed on Aug. 1, 2008, which is herein expressly incorporated by reference in its entirety.

BACKGROUND OF THE INVENTION

1. Field of the Invention

The present invention relates to a structure of a display module for a portable terminal, and a method for fabricating the same.

2. Background of the Invention

In general, a portable terminal is a device that can be carried around and has one or more functions such as to perform voice and video call communications, inputting and outputting information, storing data, and the like.

As such functions become more diversified, the portable terminal can support more complicated functions such as capturing images or video, reproducing music or video files, playing games, receiving broadcast signals, and the like. By comprehensively and collectively implementing such functions, the portable terminal may be embodied in the form of a multimedia player or device.

Various attempts have been made to implement complicated functions in such a multimedia device by means of hardware or software. For instance, a user interface environment is provided in a portable terminal to enable a user to easily and conveniently search for or select a desired function among available functions.

The portable terminal has a slim and light configuration, which requires a size decrease of components mounted therein and removal of unnecessary spaces. Furthermore, it is required that the components of the portable terminal be arranged so as to be normally operated without influencing on another components.

A display of the portable terminal is provided with a display panel for displaying visual information, and a driving circuit board for controlling the display panel. The display panel and the board are integrally formed by a frame as one module.

The display panel may be equipped with a frame structure of a high strength for protection against inner impacts, and equipped with a damping structure for protection against external impacts. According to the recent trend of light and slim configurations of the portable terminal, the frame structure and the damping structure are required to have minimized space occupation in the portable terminal.

SUMMARY OF THE INVENTION

Therefore, an object of the present invention is to provide a reinforcing and damping structure for protection of a display panel, the structure occupying a minimized volume in a portable terminal.

Another object of the present invention is to provide a method for fabricating a display module for a portable terminal capable of facilitating the entire processes.

To achieve these and other advantages and in accordance with the purpose of the present invention, as embodied and broadly described herein, there is provided a portable terminal, comprising: a display panel; an outer frame configured to mount the display panel by wrapping a bottom surface and a plurality of side surfaces of the display panel; an inner frame sandwiched between the display panel and the outer frame, and having a bottom surface supporting portion and a plurality of side surface supporting portions for supporting the bottom surface and the plurality of side surfaces of the display panel, respectively, wherein at least one of the plurality of side surface supporting portions is excluded; and a filling member filled into a gap between the outer frame and the display panel in which at least one of the plurality of side surface supporting portions of the inner frame is excluded.

The outer frame may be formed in a metallic tray type.

An upper edge portion of the outer frame may be folded so as to have a doubled thickness.

The inner frame may be formed of resin.

The display panel may be formed in a rectangular shape that a vertical side is longer than a horizontal side. And, the side surface supporting portion corresponding to the vertical side of the display panel may be excluded.

The display panel may comprise a liquid crystal display (LCD) panel, and a backlight unit for illuminating the LC panel.

The filling member may be filled into a gap in which at least one of the side surface supporting portions of the inner frame corresponding to the vertical sides of the display panel is excluded.

The filling member may be formed of a material hardened by an ultraviolet ray.

The filling member may be formed of an opaque material so as to shield light from the display panel.

According to another aspect of the present invention, there is provided a portable terminal, comprising: a display panel configured to display information; a first frame configured to mount the display panel by wrapping a bottom surface and a plurality of side surfaces of the display panel; a second frame disposed between the display panel and the first frame, and having a bottom surface supporting portion and a plurality of side surface supporting portions for supporting the bottom surface and the plurality of side surfaces of the display panel, respectively; and a filling member filled into a gap between the first frame and the display panel and later hardened.

To achieve these and other advantages and in accordance with the purpose of the present invention, as embodied and broadly described herein, there is also provided a method for fabricating a display module for a portable terminal, comprising: forming an inner frame so as to have a bottom surface supporting portion and a plurality of side surface supporting portions for supporting a bottom surface and a plurality of side surfaces of the display panel, respectively, wherein at least one of the plurality of side surface supporting portions is excluded; forming an outer frame so as to wrap the bottom surface and the plurality of side surfaces of the display panel; mounting the inner frame to the outer frame; and filling a filling member into a gap between the outer frame and the display panel in which at least one of the plurality of side surface supporting portions is excluded.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Hereinafter, a portable terminal according to the present invention will be explained in more detail with reference to the attached drawings. The suffixes attached to components of the portable terminal, such as 'module' and 'unit' were used for facilitation of the detailed description of the present invention. Therefore, the suffixes do not have different meanings from each other.

The portable terminal according to the present invention may include a portable phone, a smart phone, a notebook computer, a digital broadcasting terminal, Personal Digital Assistants (PDA), a Portable Multimedia Player (PMP), a navigation, etc. It is obvious to those skilled in the art that the preferred embodiments of the present invention can be applied not only to portable terminals, but also to stationary terminals such as a digital TV and a desk top.

Figure 1:
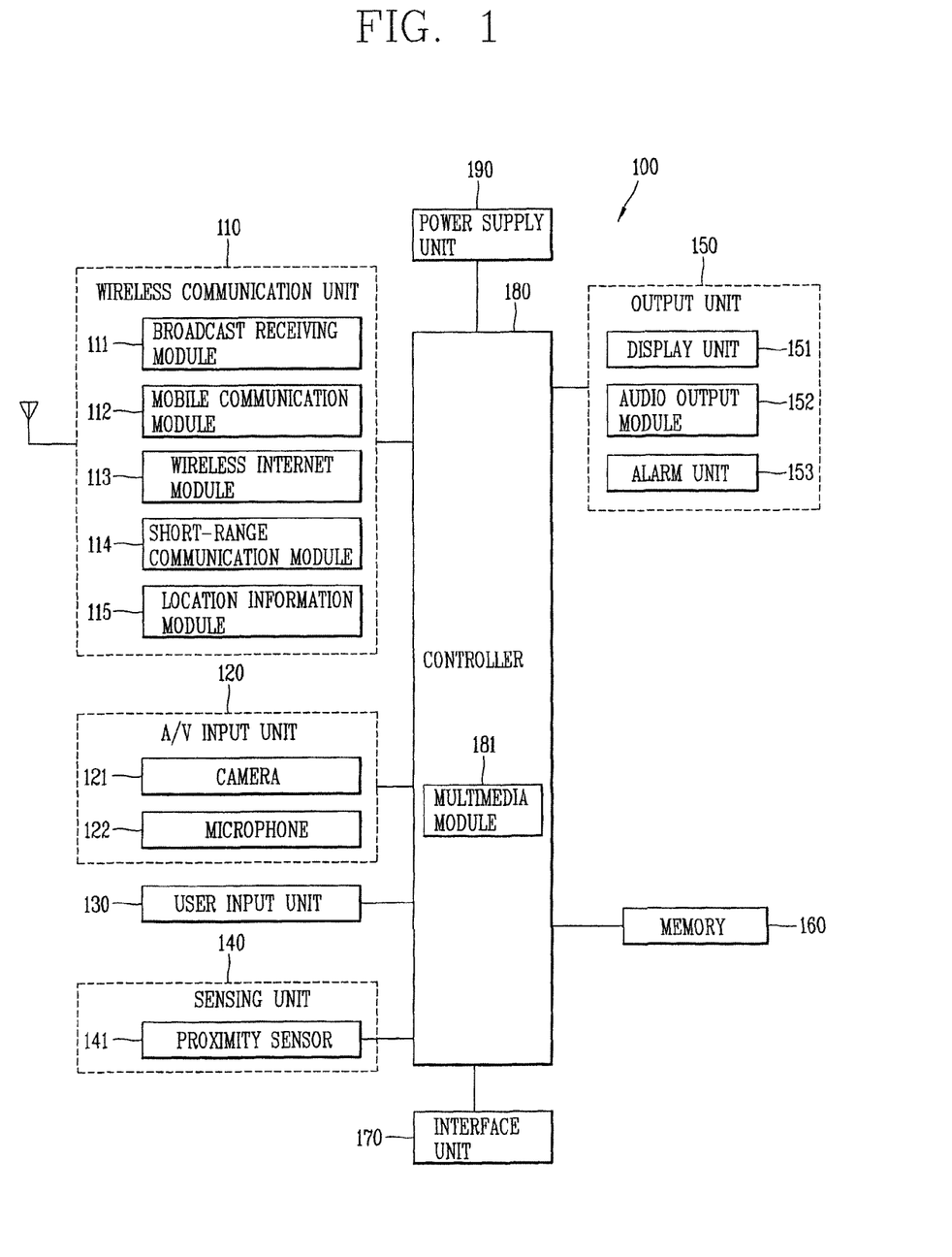
FIG. 1 is a block diagram showing a portable terminal according to the present invention.

FIG. 1 is a block diagram showing a portable terminal according to a first embodiment of the present invention.

As shown, the portable terminal 100 includes a wireless communication unit 110, an audio/video (A/V) input unit 120, a user input unit 130, a sensing unit 140, an output unit 150, a memory 160, an interface unit 170, a controller 180, a power supply unit 190, etc.

FIG. 1 shows a portable terminal having various components. However, all the disclosed components are not indispensable. The portable terminal may have a larger or smaller number of components than the disclosed components.

Hereinafter, each of the components will be explained.

The wireless communication unit 110 may include one or more components which permits wireless communication between the portable terminal 100 and a wireless communication system or network within which the portable terminal 100 is located. For example, the wireless communication unit 110 may include a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the portable terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the portable terminal 100. The position-location module 115 may be implemented using global positioning system (GPS) components which cooperate with associated satellites, network components, and combinations thereof. For example, the GPS module 115 can measure accurate time and distance respectively from more than three satellites so as to accurately calculate a current position of the portable terminal based on such three different distances according to a triangulation scheme. A scheme may be used to obtain time information and distance information from three satellites and correct error by one satellite. Specifically, the GPS module 115 can further obtain three-dimensional speed information and an accurate time, as well as position on latitude, longitude and altitude, from the position information received from the satellites.

In addition, the portable terminal 100 also includes an Audio/video (A/V) input unit 120 that provides audio or video signals to the portable terminal 100. As shown, the A/V input unit 120 includes a camera 121 and a microphone 122. The camera 121 receives and processes image frames of still pictures or video. The processed image frames may be displayed on a display unit 151.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, includes assorted noise removing algorithms to remove noise generated in the course of receiving the external audio signal. In addition, data generated by the A/V input unit 120 may be stored in the memory 160, or transmitted via one or more modules of the communication unit 110. If desired, two or more microphones and/or cameras may be used.

The portable terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the portable terminal 100 and provides status measurements of various aspects of the portable terminal 100. For instance, the sensing unit 140 may detect an open/close status of the portable terminal 100, relative positioning of components (e.g., a display and keypad) of the portable terminal 100, a change of position of the portable terminal 100 or a component of the portable terminal 100, a presence or absence of user contact with the portable terminal 100, orientation or acceleration/deceleration of the portable terminal 100, etc.

As an example, when the portable terminal 100 is a slide-type portable terminal, the sensing unit 140 may sense whether a sliding portion of the portable terminal 100 is open or closed. Other examples include the sensing unit 140 sensing the presence or absence of power provided by a power supply unit 190, the presence or absence of a coupling or other connection between an interface unit 170 and an external device, etc.

Further, the interface unit 170 is often implemented to couple the portable terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a memory card port, a port to connect a device having a recognition module to the portable terminal 100, an audio input/output ports and video input/output ports. Here, the recognition module is implemented as a chip to store each kind of information to identify an authorization right for the portable terminal 100, and may include a User Identity Module (UIM), a Subscriber Identity Module (SIM), a Universal Subscriber Identity Module (USIM), and so on. A device having the recognition module (hereinafter, will be referred to as 'identification device') may be implemented as a smart card type. Accordingly, the identification device may be connected to the portable terminal 100 through a port.

The interface unit 170 may receive data or power from an external device, and transmit it to each component inside the portable terminal 100. Or, the interface 170 transmits data inside the portable terminal 100 to an external device.

When the portable terminal 100 is connected to an external cradle, the interface unit 170 may serve as a passage through which power from the external cradle is supplied to the portable terminal 100, or a passage through which each kind of command signals input from the external cradle by a user are transmitted to the portable terminal 100. Said each kind of command signals input from the external cradle, or said power may operate as signals for recognizing that the portable terminal 100 has been precisely mounted to the external cradle.

The output unit 150 is implemented to output audio signals, or video signals, or alarm signal. And, the output unit 150 may include a display unit, an audio output unit 152, an alarm output module 153, etc.

The portable terminal 100 also includes a display unit 151 that visually displays information associated with the portable terminal 100. For instance, if the portable terminal 100 is operating in a phone call mode, the display unit 151 will generally provide a user interface (UI) or graphical user interface (GUI) which includes information associated with placing, conducting, and terminating a phone call. As another example, if the portable terminal 100 is in a video call mode or a photographing mode, the display unit 151 may additionally or alternatively display images which are associated with these modes.

Further, the display unit 151 also preferably includes a touch screen working in cooperation with an input device, such as a touchpad. This configuration permits the display unit 151 to function both as an output device and an input device. In addition, the display unit 151 may be implemented using display technologies including, for example, a liquid crystal display (LCD), a thin film transistor-liquid crystal display (TFT-LCD), an organic light-emitting diode display (OLED), a flexible display and a three-dimensional display. Some of the above display units may be configured as transparent or transmissive type of display units. These display units may be referred to as 'transparent display units', and include a Transparent OLED (TOLED) as a representative example. The portable terminal 100 may also include one or more of such display units 151.

A proximity sensor 141 may be arranged at an inner region of the portable terminal covered by the touch screen, or near the touch screen. The proximity sensor 141 indicates a sensor to sense presence or absence of an object approaching to a surface to be sensed, or an object disposed near a surface to be sensed, by using an electric field or infrared rays without a mechanical contact. The proximity sensor has a longer lifespan and a more enhanced utilization degree than a contact sensor. The proximity sensor may include a transmissive type photoelectric sensor, a direct reflective type photoelectric sensor, a mirror reflective type photoelectric sensor, a high-frequency oscillation type proximity sensor, a capacitance type proximity sensor, a magnetic type proximity sensor, an infrared rays proximity sensor, and so on.

The high-frequency oscillation type proximity sensor senses whether a target approaching thereto exists or not by reducing an oscillation amplitude of an oscillation circuit under a state that a high frequency of a sine wave has been oscillated from the oscillation circuit, and by converting the oscillation amplitude into an electric signal. Accordingly, even if any target rather than a metallic target is disposed near the high-frequency oscillation type proximity sensor, a proximity switch can sense the target without any interference.

When the touch screen is implemented as a capacitance type, proximity of a pointer to the touch screen is sensed by changes of an electric field. In this case, the touch screen (touch sensor) may be categorized into a proximity sensor.

When the pointer is positioned near the touch screen without contacting onto the touch screen, the location of the pointer, and a distance between the pointer and the touch screen can be sensed. Hereinafter, a status that the pointer is positioned to be proximate onto the touch screen without contact will be referred to as 'proximity touch', whereas a status that the pointer substantially comes in contact with the touch screen will be referred to as 'contact touch'. The pointer in a status of 'proximity touch' is positioned so as to be vertical with respect to the touch screen.

The proximity sensor senses proximity touch, and proximity touch patterns (e.g., distance, direction, speed, time, position, moving status, etc.). Information relating to the sensed proximity touch, and the sensed proximity touch patterns may be output onto the touch screen.

An audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., call signal reception sound and message reception sound. The audio output module 152 may include a receiver, a speaker, a buzzer, and so on.

An alarm unit 153 outputs signals notifying occurrence of events from the portable terminal 100. The events occurring from the portable terminal 100 may include call signal reception, message reception, a key signal input, a touch input, and so on. The alarm unit 153 may output not only video or audio signals, but also other types of signals such as signals notifying occurrence of events in a vibration manner. When a call signal or a message is received, the alarm unit 153 may output vibration so as to inform the received call signal or message. When a key signal is inputted, the alarm unit 153 may output vibration. Through the output vibration, a user may recognize an event occurrence. Signals to inform an event occurrence may be output through the display unit 151 or the audio output module 152.

The memory 160 may store programs to operate the controller 180, or may temporarily store input/output data (e.g., phonebook, messages, still images, moving images, etc.). The memory 160 may store data relating to vibration and sound of various patterns output when touches are input onto the touch screen.

The memory 160 may be implemented using any type or combination of suitable memory or storage devices including a flash memory type, a hard disk type, a multimedia card micro type, a card type (SD or XD memory), random access memory (RAM), static random access memory (SRAM), electrically erasable programmable read-only memory (EEPROM), programmable read-only memory (PROM), read-only memory (ROM), magnetic memory, magnetic or optical disk, or other similar memory or data storage device. The portable terminal 100 may operate on the Internet in association with a web storage that performs a storage function of the memory 160.

The controller 180 control an overall operation of the portable terminal 100.

For instance, the controller 180 performs controls and processes relating to data communication, video call, voice call, etc. The controller 180 may include a multimedia module 181 configured to play multimedia. The multimedia module 181 may be implemented inside the controller 180, or may be separately implemented from the controller 180.

The controller 180 may perform a pattern recognition process to recognize handwriting inputs or picture inputs on the touch screen, as texts or images, respectively.

The power supply unit 190 may receive external power or inner power, thereby supplying the power to each component under control of the controller 180.

In addition, the above various embodiments may be implemented in a computer-readable medium using, for example, computer software, hardware, or some combination thereof.

For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in a memory (for example, the memory 160), and executed by a controller or processor (for example, the controller 180).

Hereinafter, with reference to FIG. 2, will be explained communication systems where the portable terminal of the present invention can be operated.

Such communication systems may utilize different air interfaces and/or physical layers. Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 2:
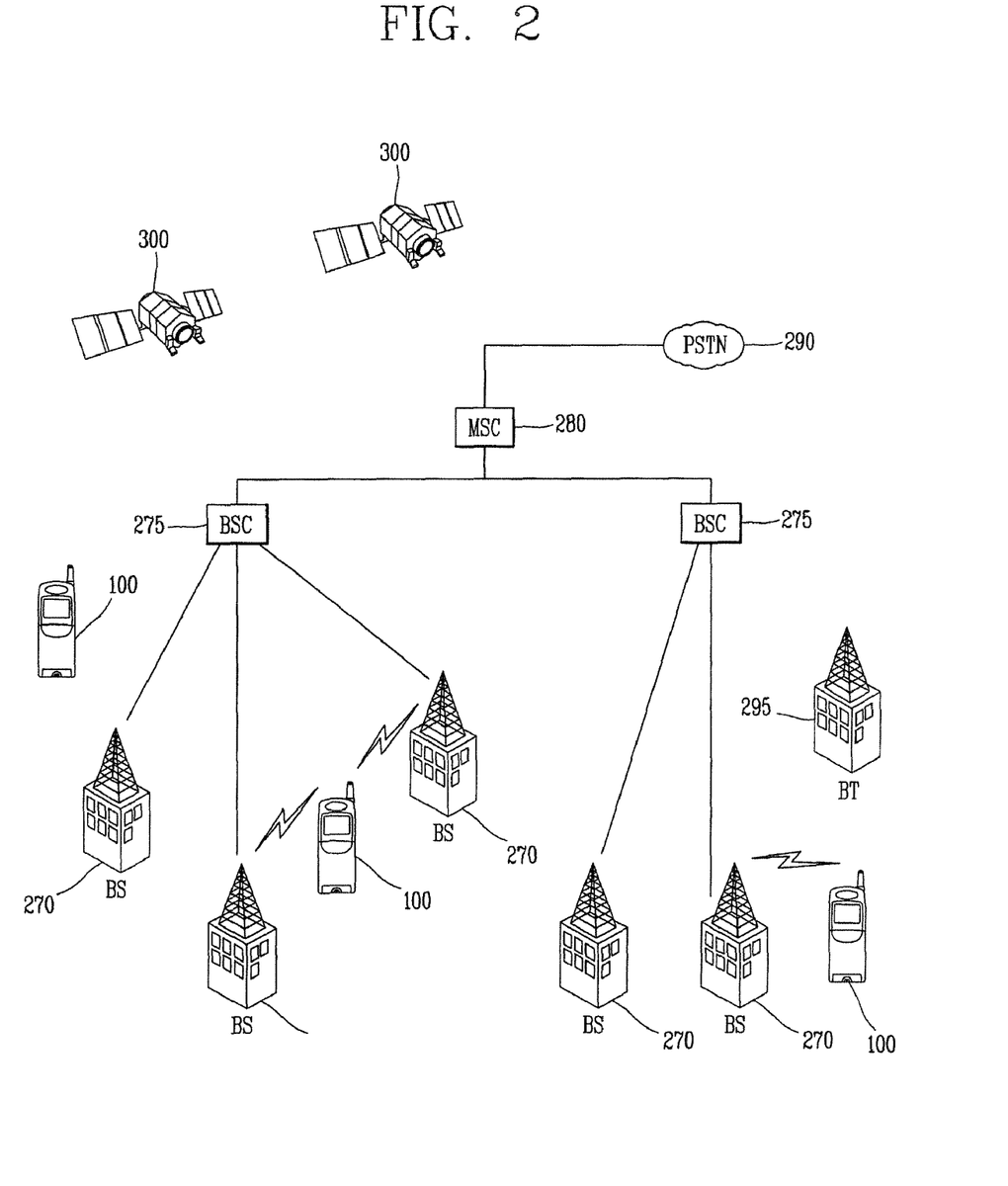
FIG. 2 is a conceptual view of a communications system where the portable terminal of the present invention can be operated.

Referring to FIG. 2, a CDMA wireless communication system may include a plurality of portable terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omni-directional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

As shown in FIG. 2, a broadcasting transmitter (BT) 295 transmits broadcasting signals to the portable terminals 100 operating within the system. The broadcast receiving module 111 (FIG. 1) of the portable terminal 100 is typically configured to receive broadcast signals transmitted by the BT 295. FIG. 2 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various portable terminals 100. The portable terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the portable terminals 100.

Hereinafter, with reference to FIGS. 3 to 9, will be explained a shape or a configuration of a display module for the portable terminal according to the present invention.

Figure 3:
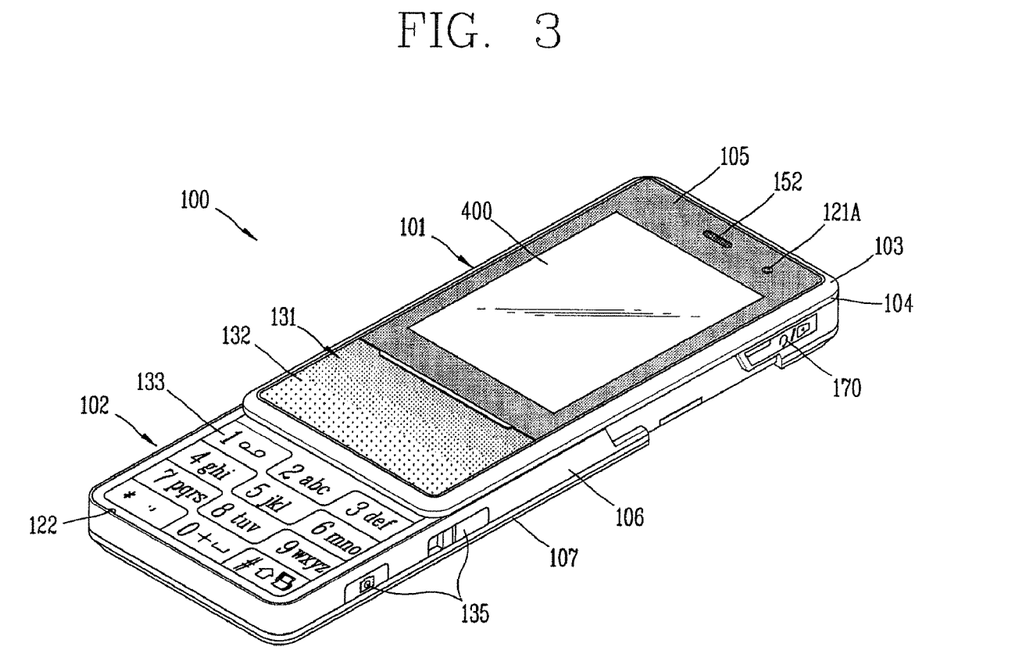
FIG. 3 is an upper perspective view of the portable terminal according to the present invention.

FIG. 3 is an upper perspective view of the portable terminal according to the present invention.

Referring to FIG. 3, the portable terminal 100 is provided with an upper body 101 and a lower body 102 slidably coupled to each other. The present invention is not limited to the slide-type of portable terminal of FIG. 3, but may be applied to any type of one having a display module, such as a bar type having one body, or a folder type having two bodies foldably connected to each other. Here, the display module indicates a physical configuration of the display unit 151.

A state that the upper body 101 completely overlaps the lower body 102 may be referred to as a 'closed configuration', whereas a state that one or more parts of the lower body 102 are exposed by the upper body 101 may be referred to as an 'opened configuration'.

The upper body 101 and the lower body 102 may have a bar shape, respectively, to overlap each other. The lower body 102 and the upper body 101 may be formed to have a sectional shape of '☐', respectively. Accordingly, the portable terminal may implement a form factor which minimizes a step occurrence between an upper surface of the upper body 101 and an upper surface of the lower body 102, or between a lower surface of the upper body 101 and a lower surface of the lower body 102 in an opened or closed configuration.

Typically, the portable terminal 100 functions in a standby mode when in the closed configuration, but the standby mode may be released by a user's manipulation. Also, the portable terminal functions in a call mode, an edition mode, etc. when in the opened configuration. Here, the call mode, the edition mode, etc. may be converted into a standby mode according to a user's manipulation or time lapse.

Functions or components of the upper body 101 and the lower body 102 may be varied according to functions or user interfaces desired by the portable terminal 100. Referring to FIG. 3, the upper body 101 includes a display module 400, an audio output module 152, a first manipulation unit 131, and a first image input unit 121A.

A case forming the appearance of the upper body 101 (casing, housing cover, etc.) is formed by an upper case 103 and a lower case 104. Each kind of electronic components are mounted in a space formed by the upper case 103 and the lower case 104.

If desired, one or more intermediate cases may be provided between the upper case 103 and the lower case 104. The upper and lower cases are usually formed from a suitably ridge material such as injection molded plastic, or formed using metallic material such as stainless steel (STS) and titanium (Ti).

The upper case 103 is provided with the display module 400, and a window 105 for protecting the display module 400.

The first manipulation unit 131 is always in an exposed state regardless of whether the portable terminal 100 is in an opened configuration or a closed configuration, and inputs a command to operate the portable terminal in any mode. The first manipulation unit 131 may include a touch panel 132 operated in a touch manner.

The first manipulation unit 131 may be further provided with illumination means for providing various lighting effects in response to a user's input.

The display module 400 for visually displaying information may include liquid crystal displays (LCD), organic light emitting diodes (OLED), e-paper, transparent OLED (TOLED), etc.

The display module 400 may further include a touch sensing unit, thereby allowing information to be input by a user's touch. In this case, the display module 400 may be formed to have a size corresponding to a front surface of the upper body 101. And, input and output operations may be performed through the display module 400 under a state that the upper body 101 is in a closed configuration. For instance, the display module 400 may output keypads so as to input numbers or texts, or to perform icon functions. And, a user may perform an input operation by touching the keypads.

The audio output unit 152 outputs a call sound. The audio output unit 152 may serve as a loud speaker for outputting each type of alarm sounds of a system, or play sounds of a multimedia, and may be further provided with an additional speaker. A through hole 105a (refer to FIG. 5) through which the audio output unit 152 is exposed out may be formed at the window 105.

The first image input unit 121A may be implemented as a camera module to capture a user's still or moving images in a self camera mode or in a video call mode.

Like the upper body 101, the lower body 102 may include an upper case 106 and a lower case 107.

A second manipulation unit 133 and a microphone 122 may be disposed on an upper surface of the upper case 106 of the lower body 102.

The second manipulation unit 133 may be referred to as keypads, and may be implemented in any types to input information in a user's tactile manner. For instance, the second manipulation unit 133 may be implemented as a dome switch or a touch screen or a touch pad to input information or commands by a user's push or touch. Also, the second manipulation unit 133 may be implemented as a jog wheel or a jog switch.

The microphone 122 may be implemented as a microphone to receive a user's voice or another sounds. The microphone 122 may be disposed on the second manipulation unit 133, or on a side surface of the lower body 102.

Side keys 135 and the interface unit 170 may be disposed on side surfaces of the upper body 101 or the lower body 102.

The side keys 135 may serve as hot keys that perform specific functions such as activation of the first image input unit 121A. The side keys 135 may be implemented to have any types to perform functions by a user's tactile manner.

The interface unit 170 serves as a passage through which the portable terminal 100 of the present invention exchanges data with external devices. For instance, the external devices include wired/wireless terminals to be connected to earphones, power supplies to supply power to short-range communication ports (e.g., IrDA port, Bluetooth port, and wireless LAN port). Also, the interface unit 170 may be implemented as a card socket (e.g., for coupling to a memory card, subscriber identity module (SIM) card, and user identity module (UIM) card).

Figure 4:
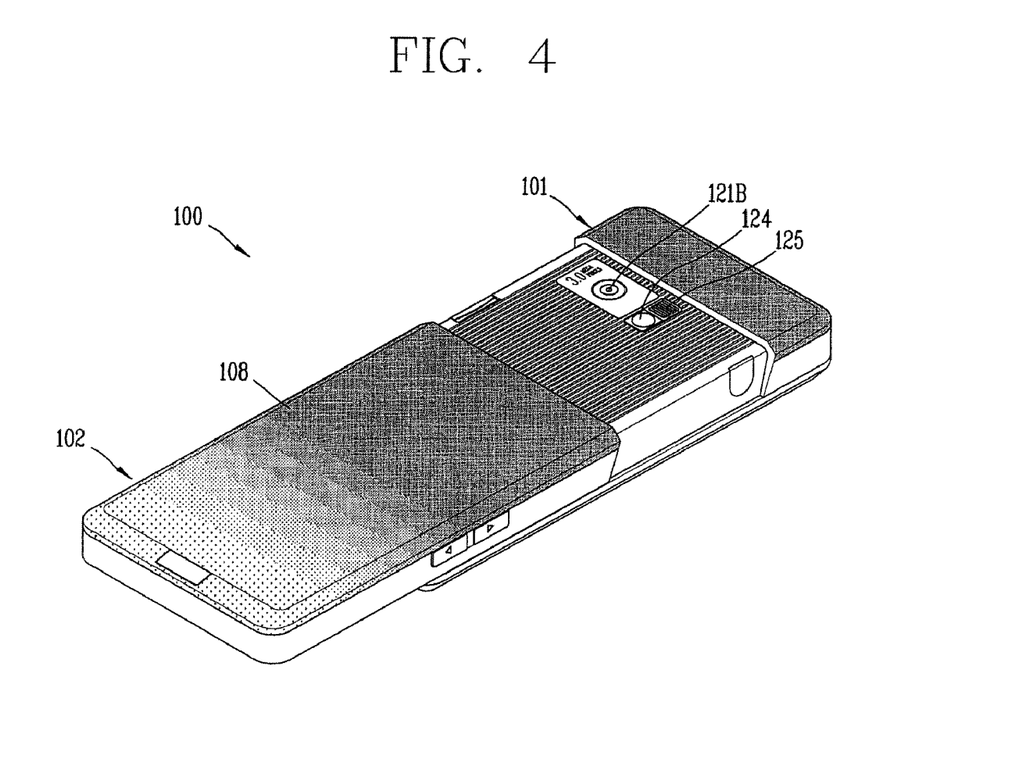
FIG. 4 is a lower perspective view of the portable terminal of FIG. 3.

FIG. 4 is a lower perspective view of the portable terminal of FIG. 3.

Referring to FIG. 4, a second image input unit 121B may be further mounted to a lower surface of the lower body 102. The second image input unit 121B may be a camera having an opposite capturing direction to the first image input unit 121A, and having different pixels from the first image input unit 121A. For instance, the first image input unit 121A operates with a relatively lower resolution than the second image input unit 121B. Such an arrangement works well during a video conference, for example. The relatively higher resolution of the image input unit 121B is useful for obtaining higher quality pictures for later use.

A flash 125 and a mirror 124 are arranged near the second image input unit 121B. When capturing an object by the second image input unit 121B, the flash 125 provides light toward the object. The mirror 124 is useful for assisting a user to position the second image input unit 121B in a self-portrait mode.

Referring to FIG. 4, the second image input unit 121B is arranged at the lower body 102, but at least one of the second image input unit 121B and other components arranged at the lower case 107 may be mounted on a lower surface of the upper body 101.

A battery cover 108 to cover a power supply means such as a battery is mounted to a lower case 107 of the lower body 102. The battery cover 108 may be formed of metallic or resin materials, or may be pigmented for color reproductions. Also, the battery cover 108 may undergo physical or chemical surface processes so as to provide voluminous visual effects.

Figure 5:
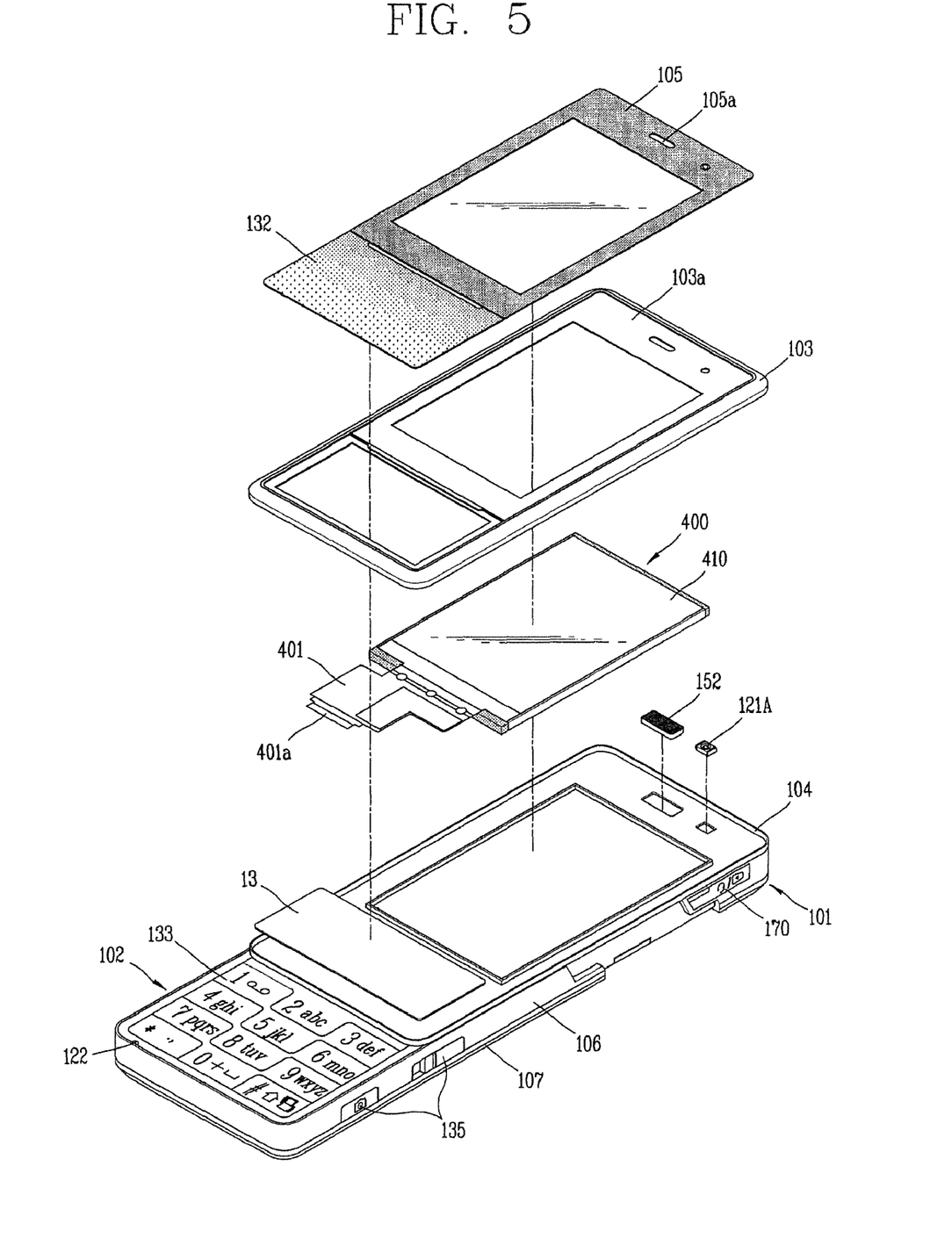
FIG. 5 is an exploded perspective view of the portable terminal of FIG. 3.

FIG. 5 is an exploded perspective view of the portable terminal of FIG. 3.

Referring to FIG. 5, the window 105 is provided therein with the display module 400, the audio output module unit 152, and the first image input unit 121A.

A mounting unit 103a for supporting the window 105 and the touch panel 132 is formed at the upper case 103. The window 105 and the touch panel 132 are formed to have a thickness similar to a depth of the mounting unit 103a. Once the window 105 and the touch panel 132 are assembled to the upper case 103, the surface of the window 105 and the touch panel 132 may have the same plane as the surface of an edge portion of the upper case 103.

The window 105 and the touch panel 132 may be additionally provided with a reinforced glass at an outer surface thereof, the reinforced glass for reducing appearance degradation of the portable terminal 100 when a pressure or an impact is applied to the portable terminal 100.

The display module 400 includes a display panel 410 and a driving circuit board 401 integrally formed with each other. The display panel 410 has a predetermined area to display information, and the driving circuit board 401 drives the display panel 410.

The driving circuit board 401 is a board having thereon a driving circuit to control liquid crystal of the LCD panel 410, and may be implemented in the form of a flexible printed circuit board (FPCB). And, the driving circuit board 401 may be provided with a connector 401a to be connected to the lower body 102 at the end thereof. The connector 401a may be printed on a flexible resin film for a slim configuration and an easy manufacturing process.

A display module fixing rib 104a for mounting the display module 400 may be formed at the lower case 104 or the upper case 103.

Figure 6:
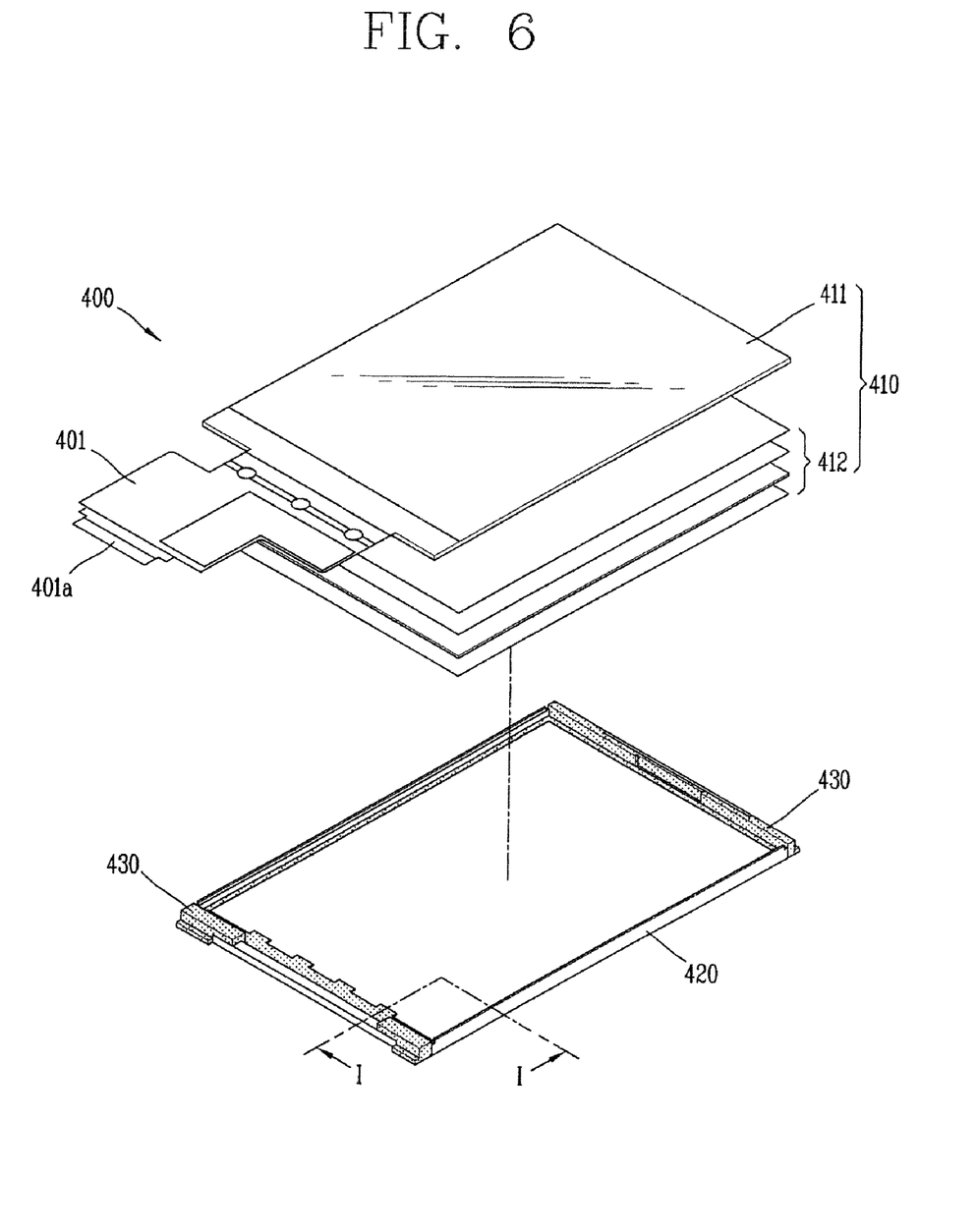
FIG. 6 is an exploded perspective view showing a display module according to the present invention.

FIG. 6 is an exploded perspective view showing the display module 400 according to the present invention.

Referring to FIG. 6, the display module 400 includes the display panel 410, an outer frame 420, and an inner frame 430.

The display panel 410 may include the aforementioned liquid crystal display (LCD), organic light emitting diodes (OLED), e-paper, transparent OLED (TOLED), etc. FIG. 6 shows an LCD panel 411.

A back light unit (BLU) 412 for providing light to the LCD panel 411 is disposed below the LCD panel 411. The back light unit 412 may include a light guide sheet for providing light such as LED to a front surface of the LCD panel 411, a plurality of diffusion sheets for diffusing light, a reflection sheet, etc.

The display panel 410 is fixed to the frame including the outer frame 420 and the inner frame 430 as one module.

The outer frame 420 is configured to wrap a bottom surface and a plurality of side surfaces of the display panel 410 for protection of the display panel 410. The outer frame 420 may be formed in a thin metallic tray type, e.g., stainless steel (SUS). The edge of the outer frame 420 is curved to wrap the side surfaces of the display panel 410.

The inner frame 430 has a shape to mount the display panel 410 therein. The inner frame 430 is formed of resin injection-molded to protect the display panel 410.

Referring to FIG. 6, the display panel 410 may be formed in a rectangular shape that a vertical side is longer than a horizontal side. One pair of sides of the display panel 410 facing each other, e.g., vertical sides are fixed to the inner frame 430.

Figure 7:
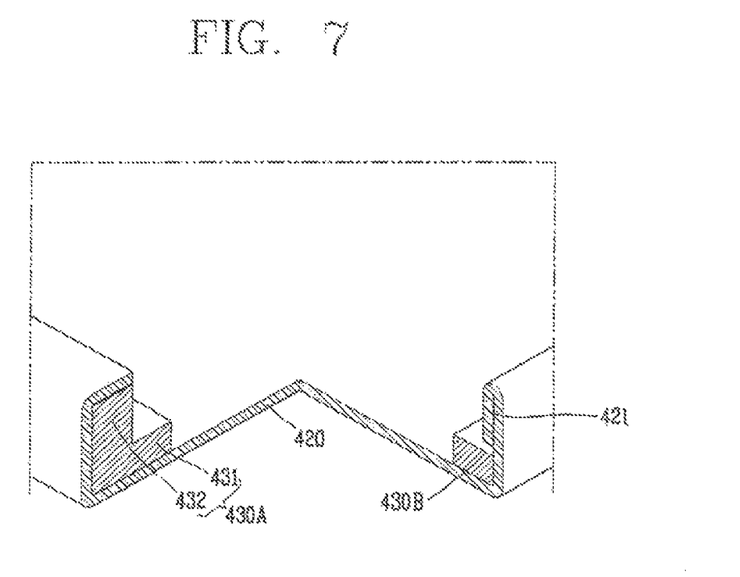
FIG. 7 is a partial sectional view taken along line 'I-I' in FIG. 6.

FIG. 7 is a partial sectional view taken along line 'I-I' in FIG. 6. Referring to FIG. 7, inner frames 430A and 430B are formed along edges of a bottom surface of the outer frame 420 implemented as a metallic tray.

The inner frame 430A disposed at the horizontal side of the outer frame 420 includes a bottom surface supporting portion 431 for supporting a bottom surface of the display panel 410, and a plurality of side surface supporting portions 432 for supporting side surfaces of the display panel 410.

However, the inner frame 430B disposed at the vertical side of the outer frame 420 is formed with excluding the side surface supporting portions 432 so as to contact only the bottom surface of the display panel 410.

Accordingly, the horizontal side surfaces of the display panel 410 contact the inner frame 430A, whereas the vertical side surfaces of the display panel 410 need not contact the inner frame 430B. As a result, a horizontal length of the display module 400 can be reduced by the excluded length of the side surface supporting portions 432. For instance, under an assumption that the outer frame 420 has a thickness of 0.15 mm and the side surface supporting portions 432 have a thickness of about 1.5 mm, a length of about 3.0 mm of the display panel 410 can be reduced as the right and left sides of the side surface supporting portions 432 are excluded.

Referring to FIG. 7, an upper edge portion 421 of the outer frame 420 may be folded so as to have a doubled thickness. The upper edge portion 421 of the outer frame 420 serves to effectively prevent an intensity lowering of the portable terminal when the side surface supporting portions 432 are excluded.

Figure 8:
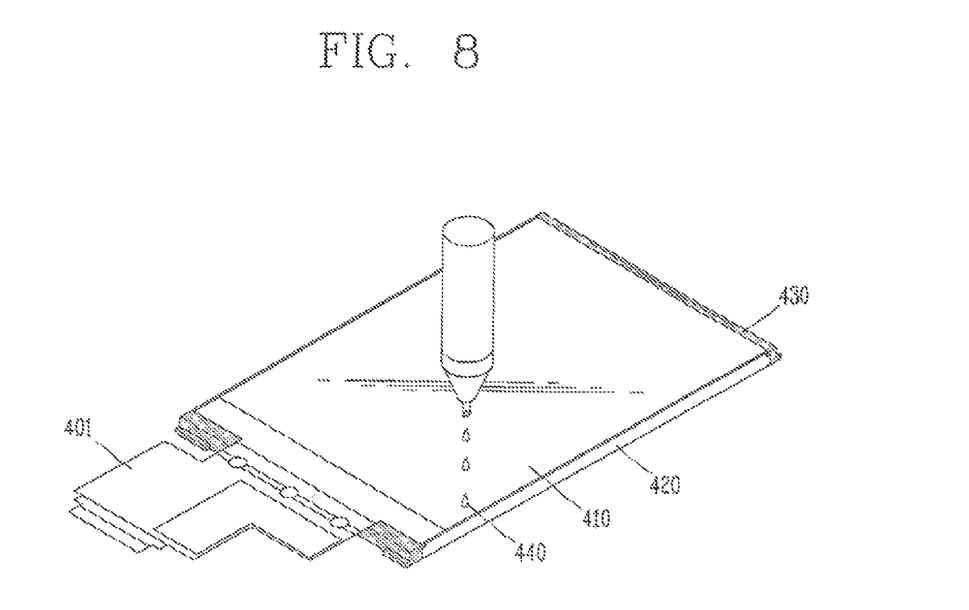
FIG. 8 is a perspective view showing a process for filling a filling member between a display panel and an outer frame.
Figure 9:
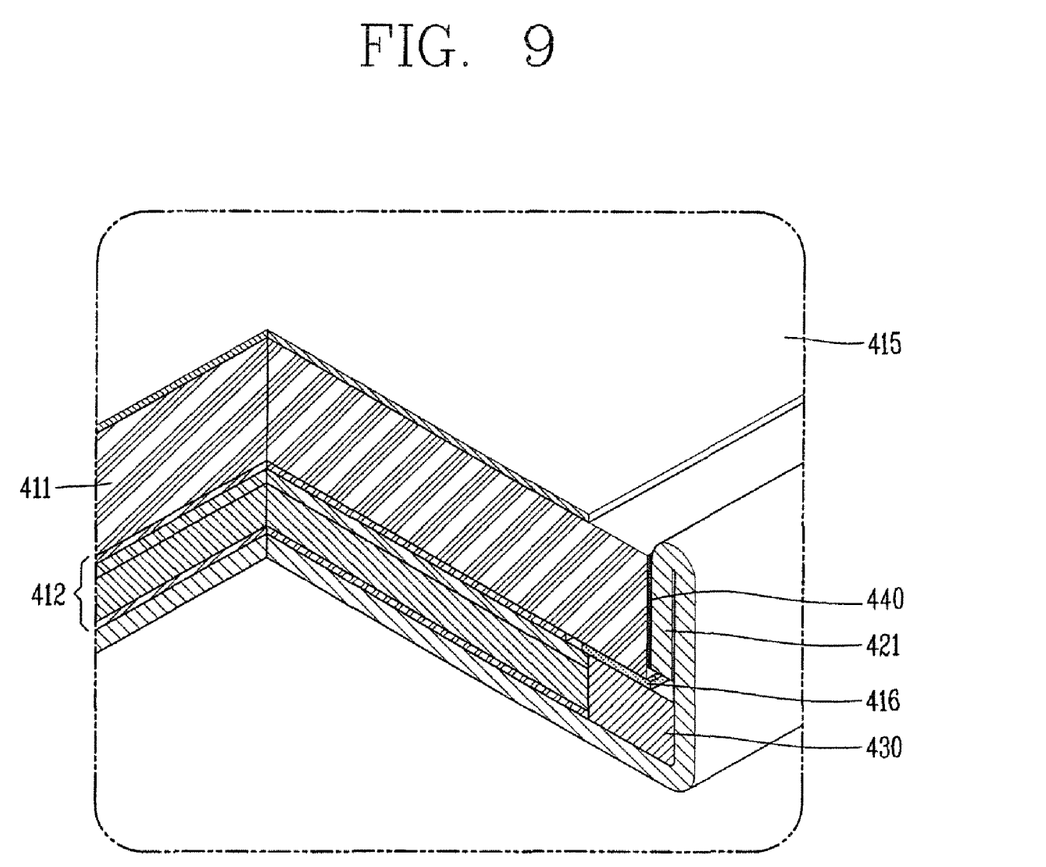
FIG. 9 is a partial sectional view of a display module completed as the filling member of FIG. 8 has been filled.

FIG. 8 is a perspective view showing a process for filling a filling member between the display panel and the outer frame, and FIG. 9 is a partial sectional view of the display module completed as the filling member has been filled in FIG. 8.

The filling member 440 is filled into a gap between the vertical side of the outer frame 420 and the display panel 410. More concretely, the vertical sides of the display panel 410 are contact-fixed to the filling member 440.

The filling member 440 is injected into a gap between the display panel 410 and the outer frame 420 in the form of liquid drops, and is hardened by ultraviolet rays, etc. The filling member 440 prevents the display panel 410 from moving in the outer frame 420 in right and left directions, and provides its damping effects. Due to the filling member 440 filled into a gap and later hardened, an assembly process is more facilitated and the gap is more completely filled than the conventional case in which a pre-formed damping member fills the gap.

The filling member 440 is filled into a gap between the display panel 410 and the outer frame 420 by a filling tool.

The filling member 440 may be formed of an opaque black resin so as to effectively block light emitted from the side surfaces of the display panel 410.

Hereinafter, a method for fabricating the display module 400 will be explained.

Firstly, the inner frame 430 is formed to include a bottom surface supporting portion 431 for supporting a bottom surface of the display panel 410, and a plurality of side surface supporting portions 432 for supporting side surfaces of the display panel 410. Here, at least one of the plurality of side surface supporting portions is excluded. And, the outer frame 420 is formed so as to wrap a bottom surface and side surfaces of the display panel 410.

Once the inner frame 430 and the outer frame 420 have been fabricated, the inner frame 430 is fixed to the outer frame 420 in a bonding manner or in a double-injection manner.

Then, the filling member 440 is filled into a gap between side surfaces of the display panel 410 having excluded side surfaces of the inner frame 430, and the outer frame 420. Since the gap has a narrow width, the filling member 440 can be injected thereinto in the form of liquid drops. And, the filling member 440 can be hardened by ultraviolet rays so as to protect the display panel 410 and the driving circuit board.

In the display module according to the present invention, a usable amount of the inner frame for protecting the display panel can be reduced by the filling member. Accordingly, the entire size of the display module can be reduced by the reduced length of the side surface supporting portions of the inner frame. Furthermore, the display module having a relatively large size can be disposed at the portable terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal, comprising:
a frame module having a first frame and a second frame, wherein each of the first frame and second frame comprises lateral opposing sides and longitudinal opposing sides and the first and second frames are in contact with each other;
a display panel disposed on the lateral opposing sides and the longitudinal opposing sides of the second frame, wherein each of the lateral opposing sides and the longitudinal opposing sides of the second frame includes a supporting portion configured to support the display panel,
wherein the supporting portion of each of the lateral opposing sides and the longitudinal opposing sides of the second frame is substantially covered by the display panel when the display panel is disposed on the frame module, and
wherein the lateral opposing sides of the second frame further include a side supporting portion protruding from the supporting portion and positioned along at least part of the lateral opposing sides such that a height of the supporting portion of the longitudinal opposing sides is shorter than a height of at least a portion of the lateral opposing sides.

2. The portable terminal of claim 1, wherein the first frame comprises a metallic material and the second frame comprises a resin material.

3. The portable terminal of claim 1, further comprising a filling member disposed at a space between the display panel and the first frame.

4. The portable terminal of claim 1, wherein an outer surface of the first frame is not in contact with the display panel, the first frame is in contact with at least one element of the portable terminal other than the display panel and the second frame, and surfaces of the second frame are not in contact with any element of the portable terminal other than the first frame and the display panel.

5. The portable terminal of claim 1, wherein the first frame comprises a first type edge configured into an upright position with a sharp inward fold thereby having a double thickness to reinforce the first type edge, and the first frame reinforces a plurality of edges of the display panel.

6. The portable terminal of claim 1, wherein the supporting portion of each of the lateral opposing sides and the longitudinal opposing sides of the second frame is positioned along a corresponding side of the lateral opposing sides and the longitudinal opposing sides of the first frame.

* * * * *